June 16, 1964 F. S. WREFORD 3,137,837
ULTRASONIC POWER METER
Filed Dec. 17, 1959

INVENTOR.
Frederick S. Wreford
BY
Paul G. Ethington
ATTORNEY

3,137,837
ULTRASONIC POWER METER
Frederick S. Wreford, Oak Park, Mich., assignor to General Motors Corporation, Detroit, Mich., a corporation of Delaware
Filed Dec. 17, 1959, Ser. No. 860,237
5 Claims. (Cl. 340—13)

This invention relates to an image cell for viewing the pattern of a beam of ultrasonic energy.

Ultrasonic energy is often used in the inspection of solid objects as, for example, in a system for detecting internal flaws in metallic castings. In such a system, it is often desirable to view the cross-sectional pattern of the beam of ultrasonic energy and to obtain an indication of the relative intensities of various portions of the pattern. A conventional means for viewing an ultrasonic beam is an image cell which comprises a plurality of small metallic flakes suspended in a liquid that is confined between a membrane and a transparent plate. The flakes are normally oriented at random such that when viewed through the transparent plate, the mixture of flakes and liquid appears as a uniform shade of gray. When an ultrasonic beam impinges upon the mixture through the membrane, the flakes tend to become oriented parallel to the wave front of the sound energy or perpendicular to the direction of propagation. Thus, when viewed through the plate, the beam pattern will appear as a light area on the image cell since the flat portions of the flakes will reflect a greater amount of light than that reflected by the randomly oriented flakes that are not in the area of the beam pattern. This type of image cell, however, does not ordinarily provide a sharp, contrasting indication of the pattern of the beam. Also, this type of image cell does not provide an adequate means for measuring the intensity of various portions of the beam pattern.

It is therefore the principal object of this invention to provide an image cell for viewing the pattern of a beam of ultrasonic energy such that the pattern will stand out as a sharp, contrasting image. It is a further object of this invention to provide a means for measuring the level of sound energy in an ultrasonic beam.

In accordance with this invention, an electric field is provided across an image cell in a direction parallel to the direction of propagation of the ultrasonic beam. The field will cause the flakes to tend to be oriented parallel to the electric field rather than being randomly oriented in the absence of ultrasonic energy. When a beam of ultrasonic energy having a power level sufficient to overcome the effect of the electric field impinges upon the flakes, then they will become oriented perpendicular to the field and will appear as light areas on a very dark background. By using an electric field of variable strength, then an indication of the power level of the beam may be obtained by observing the magnitude of the electric field necessary to prevent the ultrasonic beam from reorienting the flakes.

The novel features that are considered characteristic of this invention are set forth in the appended claims. The invention itself, however, both as to its organization and method of operation, together with further objects and advantages thereof, may best be understood by reference to the following description when read in conjunction with the accompanying drawing, in which:

Figure 1:
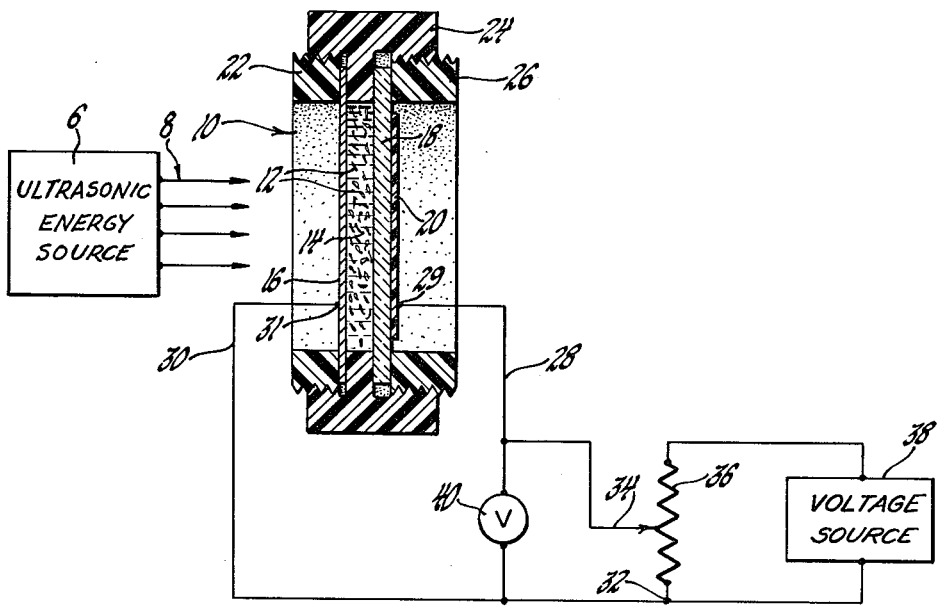
FIGURE 1 is a cross-sectional elevation of an image cell incorporating the invention and includes a schematic diagram of the electrical circuit of the invention.
Figure 2:
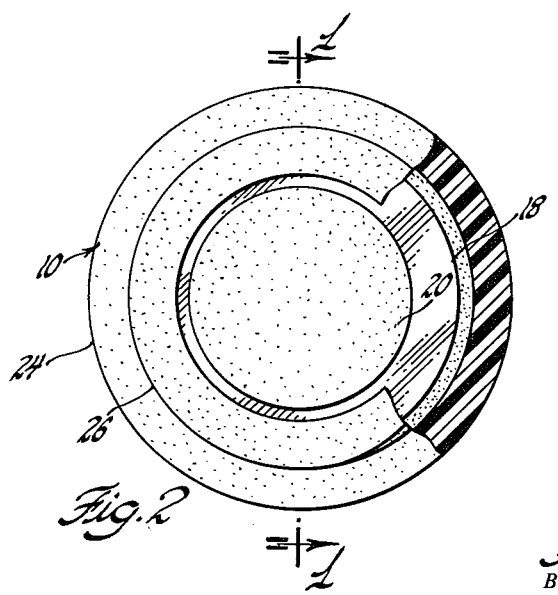
FIGURE 2 is an end view of the image cell, partly in section.

Referring now to the drawing, wherein like elements are designated by like reference numerals in both figures, and referring more particularly to FIGURE 1, an ultrasonic energy source 6 whose output as represented by lines 8 of planar ultrasonic energy is shown in proximity to an image cell 10 which is shown comprising a plurality of small metal particles 12 suspended in a liquid 14 that is confined between a metallic membrane 16 and a window or transparent plate 18. A sheet 20 of transparent conductive material is secured to the plate 18. The membrane 16 is secured by suitable mounting means, such as a retaining ring 22, to a cylindrical housing 24. The plate 18 is likewise held in place by mounting means which may take the form of a retaining ring 26 which is screw-threaded to engage internal threads on the cylindrical housing 24. The rings 22, 26, and the housing 24 are composed of a nonconductive material such as plastic or Bakelite. The membrane 16 is composed of a suitable conductive material such as nickel, aluminum, steel, or copper and may be approximately 0.0002 inch in thickness. The liquid 14 is of a density and viscosity sufficient to maintain the particles 12 in suspension and is a nonconductor such as m-xylene, for example. The metal particles 12 may take the form of small aluminum flakes or discs that are approximately 0.02 mm. in diameter and 0.0015 mm. in thickness. It should be noted that certain dimensions of the drawing have been exaggerated for illustrative purposes.

A conductor 28 is connected to the conductive sheet 20 at a terminal 29 and a conductor 30 is likewise connected to the membrane 16 at a terminal 31. These conductors are connected between a terminal 32 and a movable tap 34 on a potentiometer 36 which is connected across a suitable A.C. or D.C. power supply 38. Thus, a direct voltage may be applied between the conductive sheet 20 and the conductive membrane 16, the sheet 20 being considered positive hereinafter for illustrative purposes. A voltmeter 40 may be connected between the conductors 28 and 30 to measure and indicate the applied voltage.

In the operation of this invention, the electrostatic potential that is applied between the sheet 20 and the membrane 16 causes the particles 12 to tend to become oriented with their long dimension parallel to the electric field or perpendicular to the sheet 20 and the membrane 16. This tendency is due to the presence of free electrons in the small conductive particles which tend to shift toward the positive charge that would be present on the sheet 20. The electric field between the sheet 20 and the membrane 16 acting upon the resulting electrostatic charge on the individual particles would produce a force that would tend to rotate the particles until they were parallel to the electric field.

When viewing the image cell 10 from the side having the transparent plate 18 while the charged condition exists, the cell would appear dark since a minimum of light would be reflected from the small dimension of the particles 12. When a beam of ultrasonic energy from the source 6 is directed into the cell in a direction generally normal to the cell and impinges upon the membrane 16, the energy is transmitted through the thin membrane 16 and into the liquid 14. The ultrasonic energy tends to align the particles 12 such that the long dimension of the particles is parallel to the ultrasonic wave front and perpendicular to the applied electric field. The ultrasonic energy, however, must be strong enough to overcome the tendency of the particles 12 to be aligned with the applied electric field and, if so, a visible image will appear upon the image cell that will have a shape corresponding to the pattern of the ultrasonic beam impinging upon membrane 16. When oriented in a position perpendicular to the direction of propagation of the ultrasonic energy, the particles 12 will reflect a maximum of light through the plate 18. The result will be an image corresponding to the beam pattern that is very light relative to the dark background of particles that are still oriented with the electric field.

The strength of the beam of ultrasonic energy that is required to reorient the particles in the beam pattern will be dependent upon the magnitude of the potential existing between the sheet 20 and the membrane 16. Thus, for a given ultrasonic beam, the portions of the beam having the highest energy level will appear visibly on the image cell when a relatively high charge is appplied while the lower energy portions of the beam will not appear until the voltage is decreased. By positioning the tap 34 to provide a potential across the cell 10 such that no pattern will appear and then slowly lowering the potential by the tap 34 until the image becomes visible, the voltage across the cell as indicated by the voltmeter 40 will provide a measure of the energy level of the ultrasonic beam. Thus it is seen that the present invention provides a means for observing the shape or pattern of a beam of ultrasonic energy and also provides a means for measuring the magnitude of the ultrasonic energy involved.

While there has been illustrated a particular embodiment of the invention, it is, of course, understood that various modifications may be made such as the use of a magnetic field in place of electrostatic means for aligning the particles. The illustrative embodiment, therefore, is not to be construed in a limiting sense. It is contemplated that the appended claims will cover any such modifications as fall within the spirit and scope of the invention.

What I claim as my invention is:

1. Apparatus for measuring ultrasonic energy comprising a plurality of flat particles, a source of ultrasonic energy, means for suspending said particles in the vicinity of said source so that the ultrasonic energy impinges upon the particles whereby said particles will tend to become oriented perpendicular to the direction of propagation of said ultrasonic energy, and means operatively associated with said particles tending to align said particles in a direction parallel to said direction of propagation.

2. Apparatus for measuring the energy level of a beam of ultrasonic energy including an image cell comprising a thin conductive membrane, transparent conductive means positioned adjacent said membrane, a plurality of relatively flat metallic particles, a liquid adapted to suspend said particles, said liquid and said particles being confined between said membrane and said conductive means whereby said particles will tend to become oriented parallel to said conductive means when a beam of ultrasonic energy impinges upon said image cell in a direction perpendicular to said membrane, a source of direct voltage, a pair of conductors for connecting one side of said source to said membrane and the other side of said source to said conductive means whereby an electric field will be established between said membrane and said conductive means such that said particles will tend to become oriented perpendicular to said membrane, and means for indicating the magnitude of the voltage existing between said membrane and said conductive means.

3. Apparatus for viewing the pattern of a beam of ultrasonic energy and for measuring the intensity thereof including an image cell comprising a thin conductive membrane, a transparent plate positioned adjacent said membrane and parallel thereto, a plurality of relatively flat metallic particles, a viscous liquid adapted to suspend said particles, said liquid and said particles being confined between said membrane and said plate whereby said particles will tend to become oriented parallel to said plate when a beam of ultrasonic energy impinges upon said membrane in a direction perpendicular thereto, a transparent conductive sheet mounted on said plate, a source of voltage, conductive means for connecting one side of said source to said membrane and the other side of said source to said conductive sheet whereby an electric field will be established between said sheet and said membrane such that said particles will tend to become oriented perpendicular to said plate, and means for indicating the magnitude of the voltage existing between said membrane and said sheet.

4. Apparatus for measuring ultrasonic energy comprising a receptacle containing a fluid medium, a plurality of flakes suspended in the fluid medium, a source of ultrasonic energy in the vicinity of the receptacle so that the energy from said source impinges upon the flakes tending to orient the flakes with the surfaces thereof perpendicular to the direction of propagation of the energy from said source, force-producing means operatively coupled with said flakes tending to orient the flakes with the surfaces thereof parallel to the direction of propagation of energy from the source, means associated with the force-producing means for adjusting the force exerted thereby, and means for indicating the output of said force-producing means.

5. Apparatus for measuring the intensity of a beam of ultrasonic energy comprising: a receptacle containing a fluid medium, a plurality of relatively flat particles suspended substantially throughout the fluid medium, a source of ultrasonic energy located in proximity to the receptacle and adapted to direct ultrasonic energy planarly through the fluid medium whereby the energy impinging upon the particles suspended therein tends to align the particles with the surfaces thereof normal to the direction of propagation of the energy from the source, means to produce an electric field across the fluid medium in a direction parallel to the direction of propagation of the energy beam whereby the field tends to align the particles with the surfaces thereof parallel to the direction of propagation of energy from the source, means associated with the field producing means for adjusting the magnitude of the field, and means for detecting the magnitude of the electric field.

References Cited in the file of this patent

UNITED STATES PATENTS

| | | |
|---|---|---|
| 1,963,496 | Land | June 19, 1934 |
| 2,228,064 | Runge et al. | Jan. 7, 1941 |
| 2,525,873 | De Lano | Oct. 17, 1950 |
| 2,592,222 | Williams | Apr. 8, 1952 |
| 2,623,942 | Schlesinger | Dec. 30, 1952 |

FOREIGN PATENTS

| | | |
|---|---|---|
| 48,400 | Netherlands | May 15, 1940 |